US010682886B2

(12) United States Patent
Talbot et al.

(10) Patent No.: US 10,682,886 B2
(45) Date of Patent: Jun. 16, 2020

(54) NON-PNEUMATIC TIRE

(71) Applicant: The Goodyear Tire & Rubber Company, Akron, OH (US)

(72) Inventors: William Alain Talbot, Bastogne (BE); Nicolas Charles Louis Bilger, Messancy (BE); Francesco Sportelli, Bettembourg (LU); Samy Laroussi Mzabi, Ettelbruck (LU); Clemens Manuel Sill, Trier (DE); Joseph John Kulig, Tallmadge, OH (US); Gilles Bonnet, Niederfenlen (LU); Stefan Wilms, Helmdange (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 387 days.

(21) Appl. No.: 15/479,568

(22) Filed: Apr. 5, 2017

(65) Prior Publication Data
US 2017/0297372 A1 Oct. 19, 2017

Related U.S. Application Data

(60) Provisional application No. 62/321,943, filed on Apr. 13, 2016.

(51) Int. Cl.
*B60C 7/10* (2006.01)
*B60C 7/22* (2006.01)
(Continued)

(52) U.S. Cl.
CPC ............... *B60C 7/102* (2013.01); *B60C 7/10* (2013.01); *B60C 7/14* (2013.01); *B60C 7/18* (2013.01);
(Continued)

(58) Field of Classification Search
CPC .... B60C 7/00; B60C 7/08; B60C 7/10; B60C 7/102; B60C 7/22
See application file for complete search history.

(56) References Cited

U.S. PATENT DOCUMENTS 4,356,219 A   10/1982   Boon
7,201,194 B2   4/2007   Rhyne et al.
(Continued)

FOREIGN PATENT DOCUMENTS

| DE | 10101429 A1 | 8/2002 |
| JP | 2008132951 A | 6/2008 |
| WO | 2012098130 A1 | 7/2012 |

OTHER PUBLICATIONS

European Search Report dated Aug. 10, 2017 for Application Serial No. EP17165980.

*Primary Examiner* — Justin R Fischer
(74) *Attorney, Agent, or Firm* — June E Rickey

(57) ABSTRACT

A non-pneumatic tire is described that includes a ground contacting annular tread portion, a shear band, wherein the shear band is formed of a first and second inextensible layer, and a low modulus material positioned between the first and second inextensible layer. The non-pneumatic tire further includes a connecting web positioned between a hub and the shear band, wherein the connecting web is formed of one or more spokes extending from an inner ring to an outer ring, wherein the one or more spokes are formed from a material reinforced with a three dimensional spacer structure.

15 Claims, 9 Drawing Sheets

(51) Int. Cl.
B60C 7/14 (2006.01)
B60C 9/18 (2006.01)
B60C 7/18 (2006.01)

(52) U.S. Cl.
CPC ...... B60C 9/1807 (2013.01); *B60C 2007/146* (2013.01)

(56) References Cited

U.S. PATENT DOCUMENTS

| | | |
|---|---|---|
| 2010/0307653 A1 | 12/2010 | Delfino |
| 2011/0168313 A1 | 7/2011 | Ma |
| 2012/0234445 A1* | 9/2012 | Manesh .................... B60C 7/14 152/310 |
| 2012/0318417 A1 | 12/2012 | Dotson |

* cited by examiner

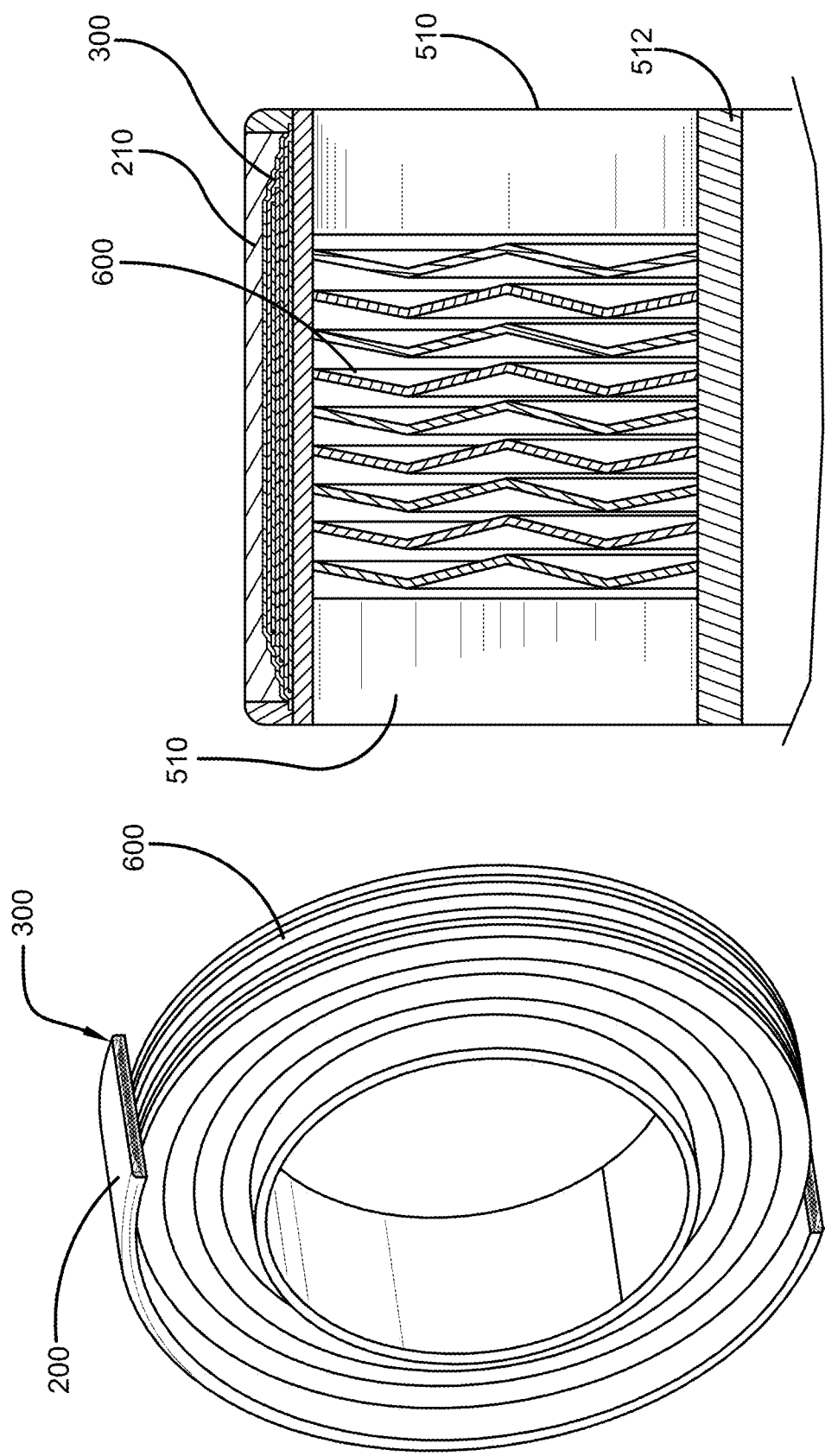

NON-PNEUMATIC TIRE

FIELD OF THE INVENTION

The present invention relates generally to vehicle tires and non-pneumatic tires, and more particularly, to a non-pneumatic tire.

BACKGROUND OF THE INVENTION

The pneumatic tire has been the solution of choice for vehicular mobility for over a century. The pneumatic tire is a tensile structure. The pneumatic tire has at least four characteristics that make the pneumatic tire so dominant today. Pneumatic tires are efficient at carrying loads, because all of the tire structure is involved in carrying the load. Pneumatic tires are also desirable because they have low contact pressure, resulting in lower wear on roads due to the distribution of the load of the vehicle. Pneumatic tires also have low stiffness, which ensures a comfortable ride in a vehicle. The primary drawback to a pneumatic tire is that it requires compressed gasses. A conventional pneumatic tire is rendered useless after a complete loss of inflation pressure.

A tire designed to operate without inflation pressure may eliminate many of the problems and compromises associated with a pneumatic tire. Neither pressure maintenance nor pressure monitoring is required. Structurally supported tires such as solid tires or other elastomeric structures to date have not provided the levels of performance required from a conventional pneumatic tire. A structurally supported tire solution that delivers pneumatic tire-like performance would be a desirous improvement.

Non pneumatic tires are typically defined by their load carrying efficiency. "Bottom loaders" are essentially rigid structures that carry a majority of the load in the portion of the structure below the hub. "Top loaders" are designed so that all of the structure is involved in carrying the load. Top loaders thus have a higher load carrying efficiency than bottom loaders, allowing a design that has less mass.

The purpose of the shear band is to transfer the load from contact with the ground through tension in the spokes or connecting web to the hub, creating a top loading structure. When the shear band deforms, its preferred form of deformation is shear over bending. The shear mode of deformation occurs because of the inextensible membranes located on the outer portions of the shear band. Prior art non-pneumatic tire typically have a shear band made from rubber materials sandwiched between at least two layers of inextensible belts or membranes. The disadvantage to this type of construction is that the use of rubber significantly increases the cost and weight of the non-pneumatic tire. Another disadvantage to the use of rubber is that is generates heat, particularly in the shear band. Furthermore, the rubber in the shear band needs to be soft in shear, which makes it difficult to find the desired compound.

Thus an improved non-pneumatic tire is desired that has all the features of the pneumatic tires without the drawback of the need for air inflation is desired.

BRIEF DESCRIPTION OF THE DRAWINGS

The present invention will be better understood through reference to the following description and the appended drawings, in which:

FIG. 2A is a perspective view of a non-pneumatic tire wherein the spokes are removed and only a circumferential connecting web is shown;

FIG. 2B is a cross-sectional view of FIG. 1;

DEFINITIONS

The following terms are defined as follows for this description.

"Auxetic" means a material having a negative Poisson's ratio.

"Equatorial Plane" means a plane perpendicular to the axis of rotation of the tire passing through the centerline of the tire.

"Free area" is a measure of the openness of the fabric per DIN EN 14971, and is the amount of area in the fabric plane that is not covered by yarn. It is a visual measurement of the tightness of the fabric and is determined by taking an electronic image of the light from a light table passing through a six inch by six inch square sample of the fabric and comparing the intensity of the measured light to the intensity of the white pixels.

"Inextensible" means that a given layer or reinforcement has an extensional stiffness greater than about 25 Ksi.

"Knitted" is meant to include a structure producible by interlocking a series of loops of one or more yarns by means of needles or wires, such as warp knits and weft knits.

"Sandwich fabric" means a three dimensional fabric structure composed from two outer layers knitted together independent, connected by yarns or other knitted layers.

"Three dimensional spacer structure" means a three dimensional structure composed from two outer layers of fabric, each outer layer of fabric having reinforcement members (such as yarns, filaments or fibers) which extend in a first and second direction, wherein the two outer layers are connected together by reinforcement members (yarns, filaments or fibers) or other knitted layers that extend in a defined third direction. An "open" three dimensional spacer structure is comprised of individual pile fibers or reinforcements that connect the first and second layer of fabric. A "closed" three dimensional structure utilizes fabric piles that connect the first and second layers.

"Woven" is meant to include a structure produced by multiple yarns crossing each other at right angles to form the grain, like a basket.

DETAILED DESCRIPTION OF THE INVENTION

Figure 1:
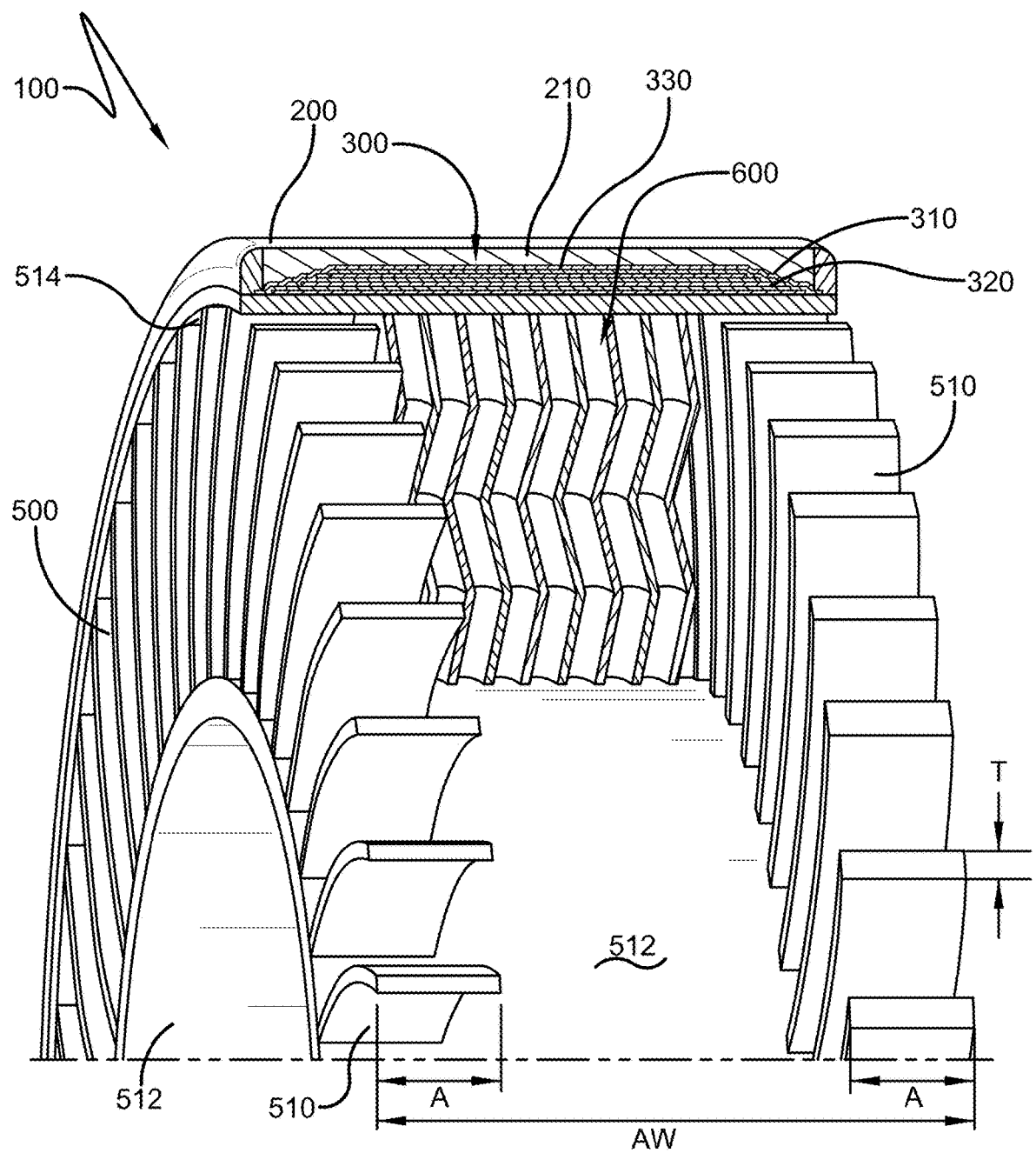
FIG. 1 is a cross-sectional view of a first embodiment of a non-pneumatic tire of the present invention.

Examples of a non-pneumatic tire 100 of the present invention is shown in FIG. 1. The tire of the present invention includes a radially outer ground engaging tread (not shown), a shear band 300, and a connecting web 500. The connecting web 500 may have different designs, as described in more detail, below. The non-pneumatic tire of the present invention is designed to be a top loading structure, so that the shear band 300 and the connecting web 500 efficiently carries the load. The shear band 300 and the connecting web are designed so that the stiffness of the shear band is directly related to the spring rate of the tire. The connecting web is designed to be a stiff structure under tensile load that buckles or deforms in the tire footprint and does not compress or carry a compressive load. This allows the rest of the connecting web not in the footprint area the ability to carry the load. It is desired to allow the shearband to bend to overcome road obstacles. The approximate load distribution is such that approximately 90-100% of the load is carried by the shear band and the upper portion of the connecting web, so that the lower portion of the connecting web carry virtually zero of the load, and preferably less than 10%.

The tread portion 200 may have no grooves or may have a plurality of longitudinally oriented tread grooves forming essentially longitudinal tread ribs there between. Ribs may be further divided transversely or longitudinally to form a tread pattern adapted to the usage requirements of the particular vehicle application. Tread grooves may have any depth consistent with the intended use of the tire. The tire tread 200 may include elements such as ribs, blocks, lugs, grooves, and sipes as desired to improve the performance of the tire in various conditions.

Shear Band

The shear band 300 is preferably an annular structure that is located radially inward of the tire tread 200. A layer of tread rubber 210 is adhered to the radially outer surface of the shear band. As shown in FIG. 1, the shear band is comprised of two inextensible layers 310, 320 arranged in parallel, wherein the layers 310,320 are separated by a layer of rubber 330. Each inextensible layer 310,320 may be formed of parallel inextensible reinforcement cords embedded in an elastomeric coating. The reinforcement cords may be steel, aramid, nylon or other inextensible structure.

In the first reinforced elastomer layer 310, the reinforcement cords are preferably oriented at an angle Φ in the range of 0 to about +/−10 degrees relative to the tire equatorial plane. In the second reinforced elastomer layer 320, the reinforcement cords are preferably oriented at an angle φ in the range of 0 to about +/−10 degrees relative to the tire equatorial plane. Preferably, the angle Φ of the first layer is in the opposite direction of the angle φ of the reinforcement cords in the second layer. That is, an angle +Φ in the first reinforced elastomeric layer and an angle −φ in the second reinforced elastomeric layer.

The shear band has a shear stiffness GA. The shear stiffness GA may be determined by measuring the deflection on a representative test specimen taken from the shear band. The upper surface of the test specimen is subjected to a lateral force F as shown below. The test specimen is a representative sample taken from the shear band and having the same radial thickness as the shearband. The shear stiffness GA is then calculated from the following equation:

$$GA = F*L/\Delta X,$$

wherein F is the shear load, L is the shear layer thickness, and delta X is the shear deflection.

The shear band has a bending stiffness EI. The bending stiffness EI may be determined from beam mechanics using the three point bending test. It represents the case of a beam resting on two roller supports and subjected to a concentrated load applied in the middle of the beam. The bending stiffness EI is determined from the following equation: $EI=PL^3/48*\Delta X$, where P is the load, L is the beam length, and $\Delta X$ is the deflection.

It is desirable to maximize the bending stiffness of the shearband EI and minimize the shear band stiffness GA. The acceptable ratio of GA/EI would be between 0.01 and 20, with an ideal range between 0.01 and 5. EA is the extensible stiffness of the shear band, and it is determined experimentally by applying a tensile force and measuring the change in length. The ratio of the EA to EI of the shearband is acceptable in the range of 0.02 to 100 with an ideal range of 1 to 50.

The shear band 300 preferably can withstand a maximum shear strain in the range of 15-30%. The invention is not limited to the shear band structure disclosed herein, and may comprise any structure which has a GA/EI in the range of 0.01 to 20, or a EA/EI ratio in the range of 0.02 to 100, or a spring rate in the range of 20 to 2000, as well as any combinations thereof. More preferably, the shear band has a GA/EI ratio of 0.01 to 5, or an EA/EI ratio of 1 to 50, or a spring rate of 170 lb./in, and any subcombinations thereof. The tire tread is preferably wrapped about the shear band and is preferably integrally molded to the shear band.

Connecting Web

The non-pneumatic tire of the present invention further includes a radial connecting web 500 as shown in FIG. 1. The connecting web 500 comprises a plurality of circumferentially aligned spokes 510 that extend from an inner hub 512 to the inner radius of the shear band 514. The spokes 510 are preferably oriented in the radial direction. The radial connecting web 500 has a low resistance to the vertical or radial deformation and a bigger resistance to the lateral deformation of the tire. Their orientation are in the opposed direction in order to give a higher structural stiffness.

The spokes may be curved or straight. Preferably, the non-pneumatic tire comprises two sets of circumferentially aligned spokes 510. The spokes may have different cross-sectional designs. The spokes functions to carry the load transmitted from the shear layer. The spokes are primarily loaded in tension and shear, and carry no load in compression. Each spoke 510 as described herein has an axial thickness A that is substantially less than the axial thickness AW of the non-pneumatic tire. The axial thickness A is in the range of 5-20% of AW, more preferably 5-10% AW.

Figures 12, 13:
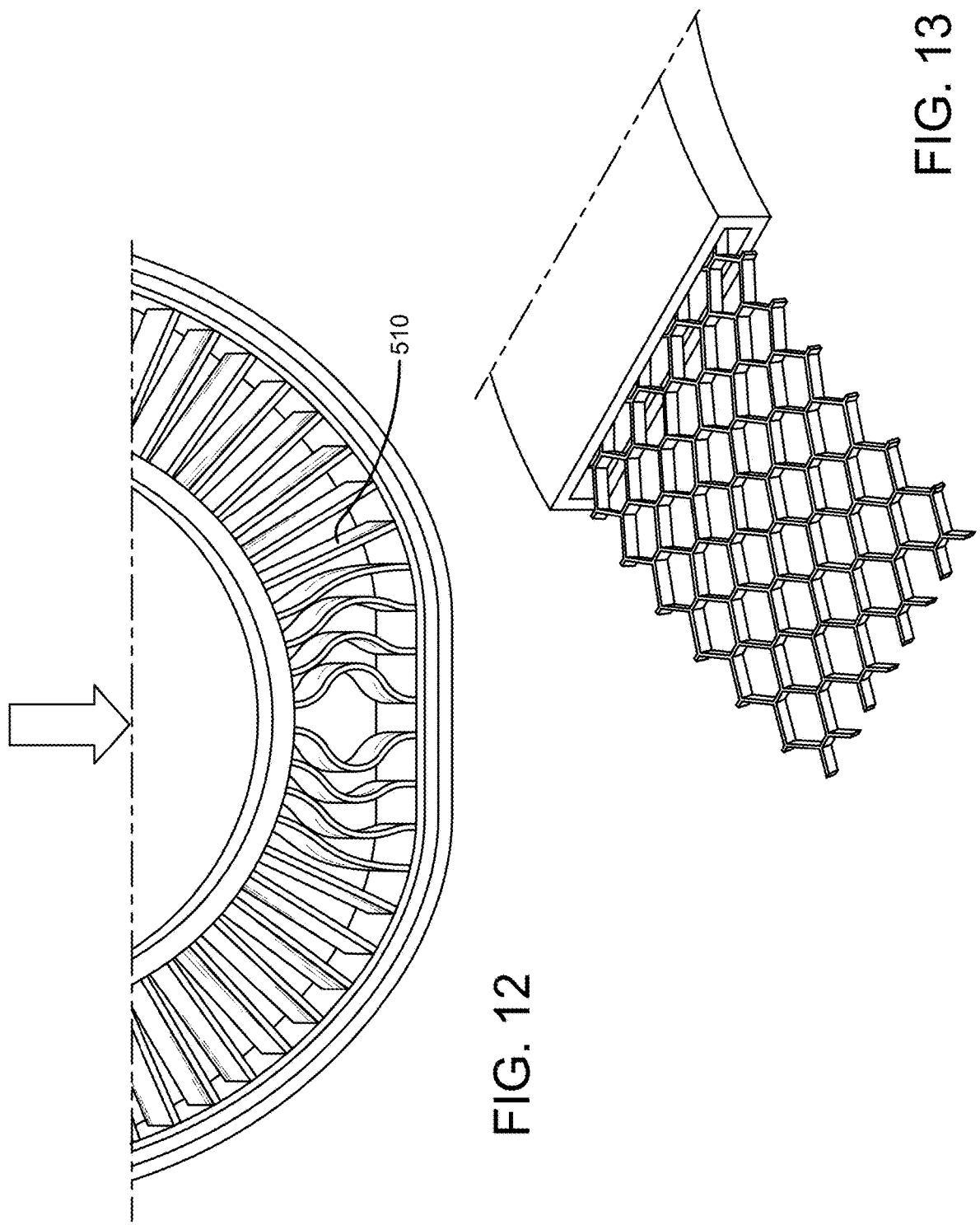
FIG. 12 is a side view of a portion of the non-pneumatic tire undergoing compression in the footprint.
FIG. 13 is a partial cutaway view of a spoke of the present invention.
Figure 14:
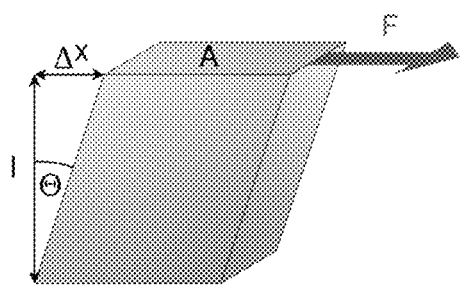
FIG. 14 is the deflection measurement on a shear band from a force F.

The spokes 510 preferably extend in the radial direction. The spokes 510 are designed to bulge or deform in the radial direction. When the non-pneumatic tire is loaded, the spokes will deform as shown in FIG. 12 when passing through the contact patch with substantially no compressive resistance, supplying zero or insignificant compressive force to load bearing. The predominant load of the spokes is through tension and shear, and not compression.

The spokes have a rectangular cross section as shown in FIG. 1, but are not limited to a rectangular cross-section, and may be round, square, elliptical, etc.

Figure 3A:
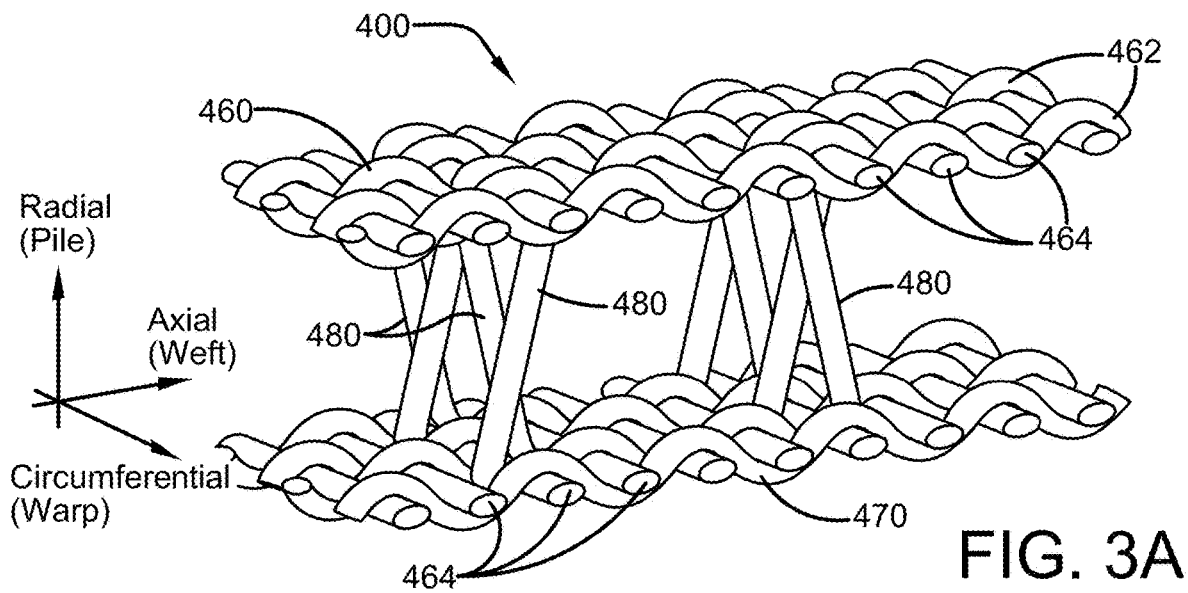
FIG. 3A is a perspective view of a first embodiment of an open three dimensional fabric structure, and FIG. 3B are exemplary cross-sectional configurations.

The spokes are preferably formed of an elastic material such as rubber or a thermoplastic elastomer. The spokes are preferably reinforced with a three dimensional spacer structure, as shown for example, in FIG. 3A. The three dimensional spacer structure 400 is a type of structure that has a first and second layer of fabric 460,470, wherein each layer of fabric is formed from a plurality of first reinforcement members 462 that extend in a first or weft direction and a plurality of second reinforcement members 464 which extend in a second or warp direction. The first and second reinforcement members 462,464 may be perpendicular to each other as shown, or crossed at a desired angle. As shown in FIG. 3A, the reinforcement members 462 are interlaced or interwoven with the reinforcements 464. The first and second reinforcement layers may be knitted, woven, nonwoven, interlaced or non-interlaced. The first and second layers 462,464 of fabric are preferably oriented parallel with respect to each other and are interconnected with each other by reinforcement connecting members 480,490 that extend in a third or pile dimension. The perpendicular distance between the connecting layers 460,470 or Z direction dimension of the three dimensional structure is in the range of about 2 millimeters to about 25 millimeters, more preferably about 3-10 millimeters, and even more preferably in the range of 5-10 mm.

Figure 3B:
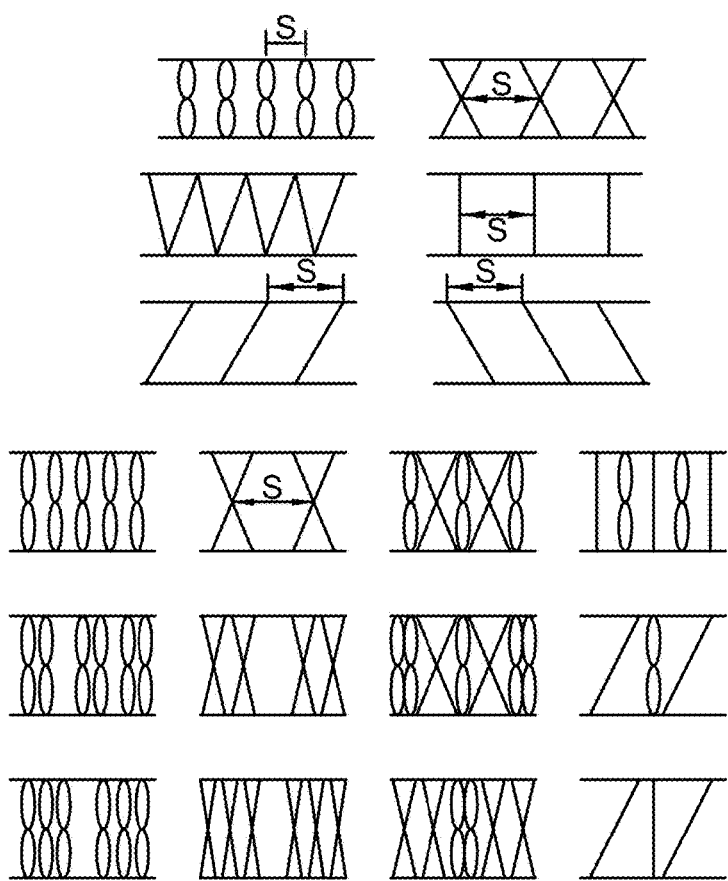
Figure 4A:
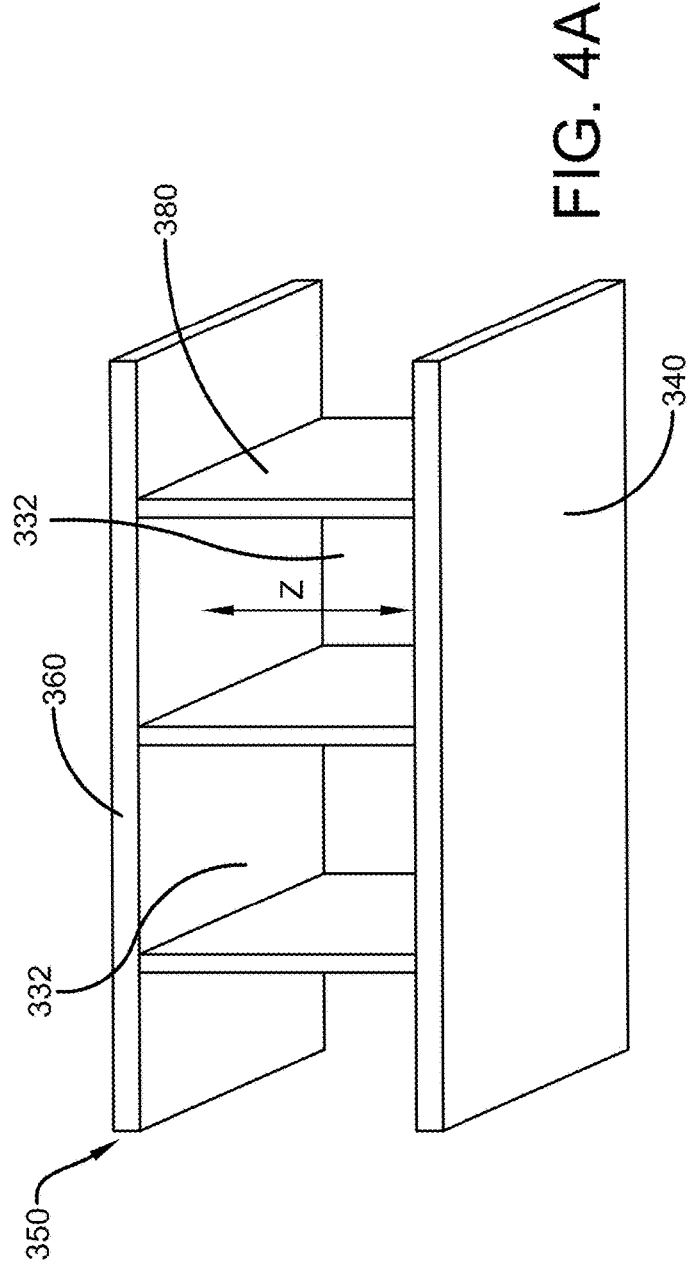
FIG. 4A is a perspective view of a second embodiment of a closed three dimensional fabric structure while FIG. 4B are exemplary closed configurations.
Figure 4B:
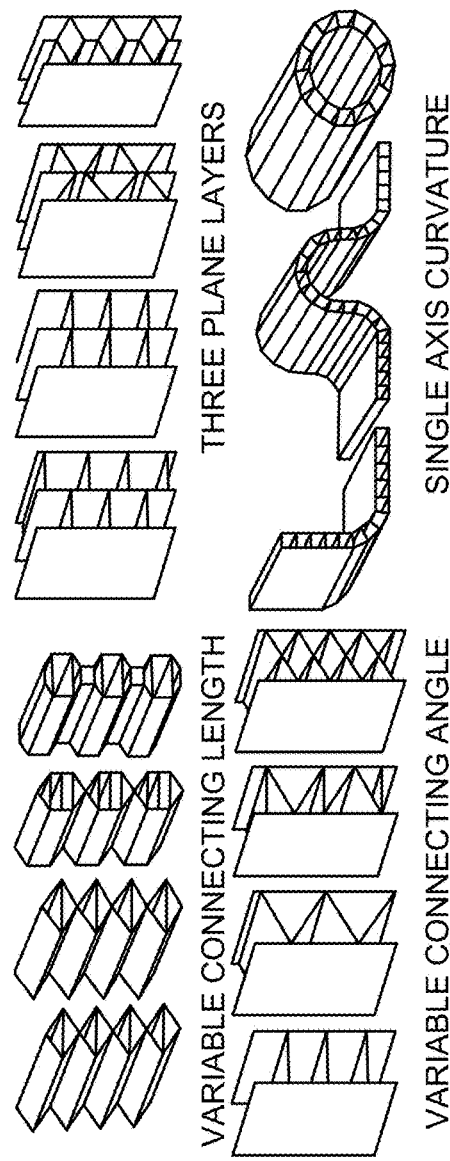

The three dimensional spacer structure 400 may have different arrangement of the reinforcement connecting members as shown in FIG. 3B. The reinforcement member or reinforcement connecting member may comprise one or more yarns, wire, one or more filaments, one or more fibers, or one or more reinforcement cords. The reinforcement member or reinforcement cross member may be formed of glass fiber, carbon fiber, basalt fibers, organic fibers, nylon, aramid, polyester, steel or metal wire, or combinations thereof. Preferably, the three dimensional fabric structure 400 and/or reinforcement member is treated with an RFL adhesive, which is a well-known resorcinol-formaldehyde resin/butadiene-styrene-vinyl pyridine terpolymer latex, or a blend thereof with a butadiene/styrene rubber latex, that is used in the tire industry for application to fabrics, fibers and textile cords for aiding in their adherence to rubber components (for example, see U.S. Pat. No. 4,356,219.) The reinforcement members may be single end dipped members (i.e., a single reinforcement member is dipped in RFL adhesive or adhesion promoter.)

The three dimensional fabric structure 400 may have a density in the range of 700-1000 gram/meter2. The compression stiffness of the three dimensional fabric structure 400 may range from 150 to 300 kPa, and more preferably range from 150 to 200 kPa.

The axial spacing S of the reinforcement connecting members 480 as shown in FIG. 3B may also be adjusted in order to control the stiffness of the shear band. The Spacing S may range from 3 mm to 8 mm.

The radial spokes are designed such that the spokes have a low resistance to radial deformation and a higher resistance to the lateral deformation of the tire. Thus, if the radial spokes are reinforced with a three dimensional spacer structure shown in FIGS. 3-11, the cross members of the three dimensional spacer structure 380,480,580,780,890 are preferably aligned with the axial direction of the tire and perpendicular to the radial direction, and the layers 460,470 are preferably oriented in the radial direction of the radial spoke. See also FIG. 13.

Figure 5:
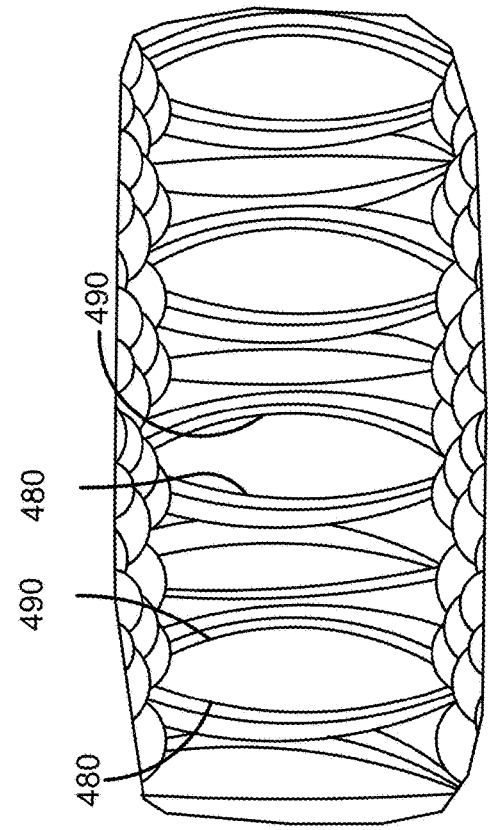
FIGS. 5-11 are perspective views of exemplary three dimensional fabric structures suitable for use in the invention.
Figure 6:
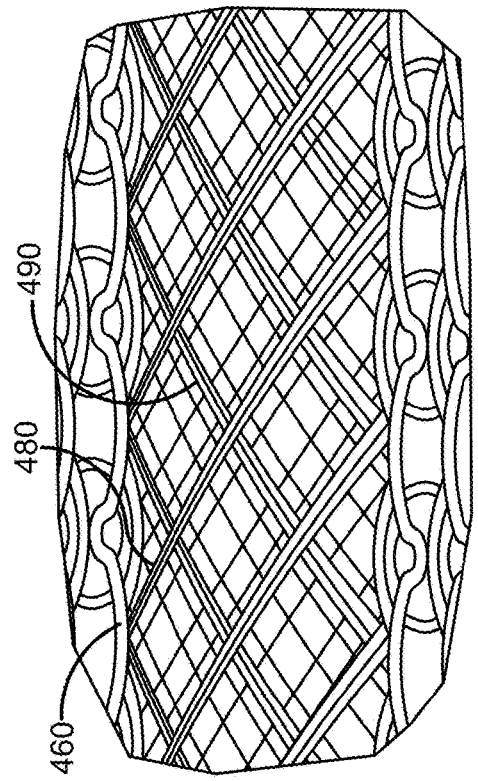
Figure 7:
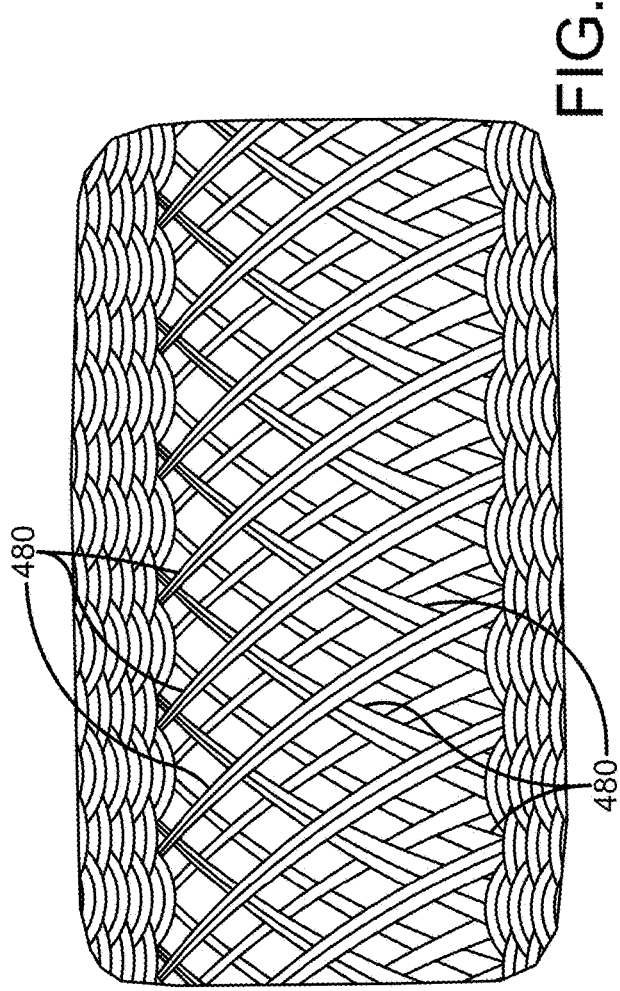

FIGS. 5-7 illustrate various different configurations of the cross members 480, 490, and further illustrate that the cross-members need not be perpendicular to the fabric layers 460,470.

Figure 8:
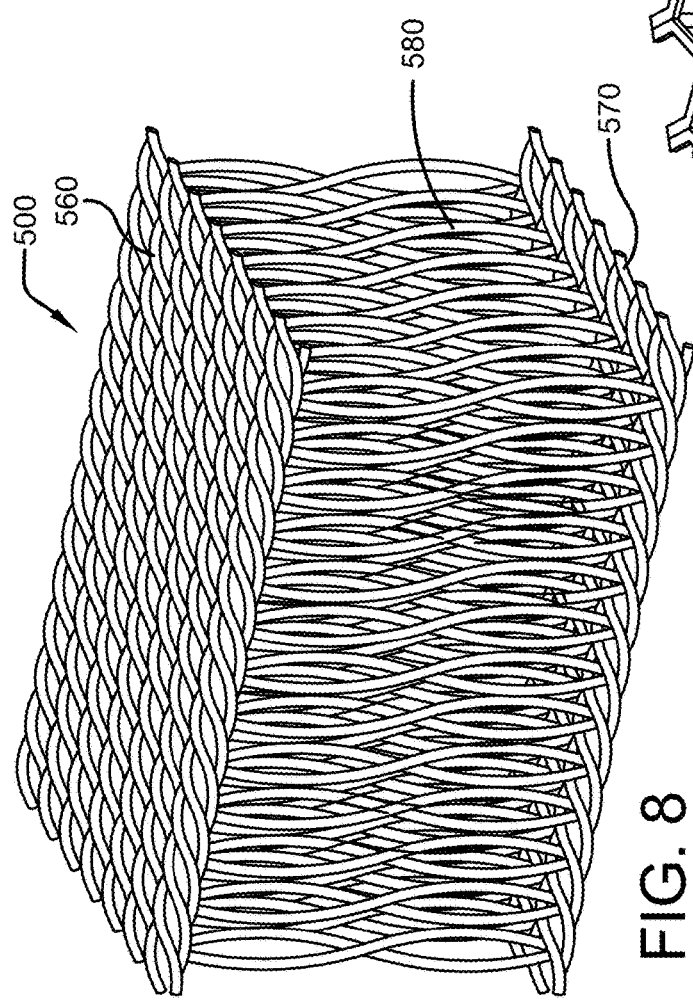

An alternate embodiment 500 of the three dimensional structure is shown in FIG. 8, and comprises a first woven layer 560 of fabric, and a second woven layer 570 of fabric. The first and second layers are joined together by a plurality of cross members 580 formed in the shape of an "8".

Figure 9:
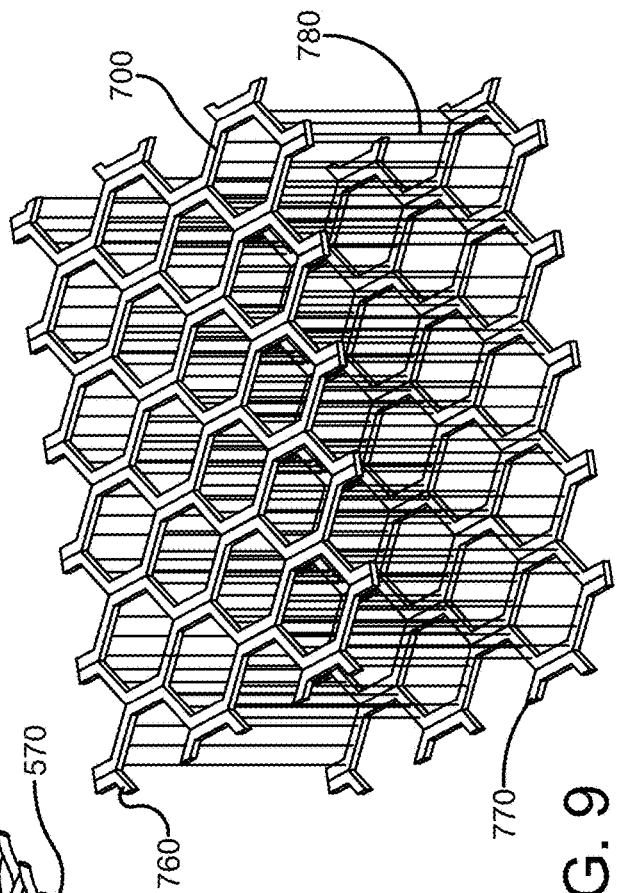
Figure 10:
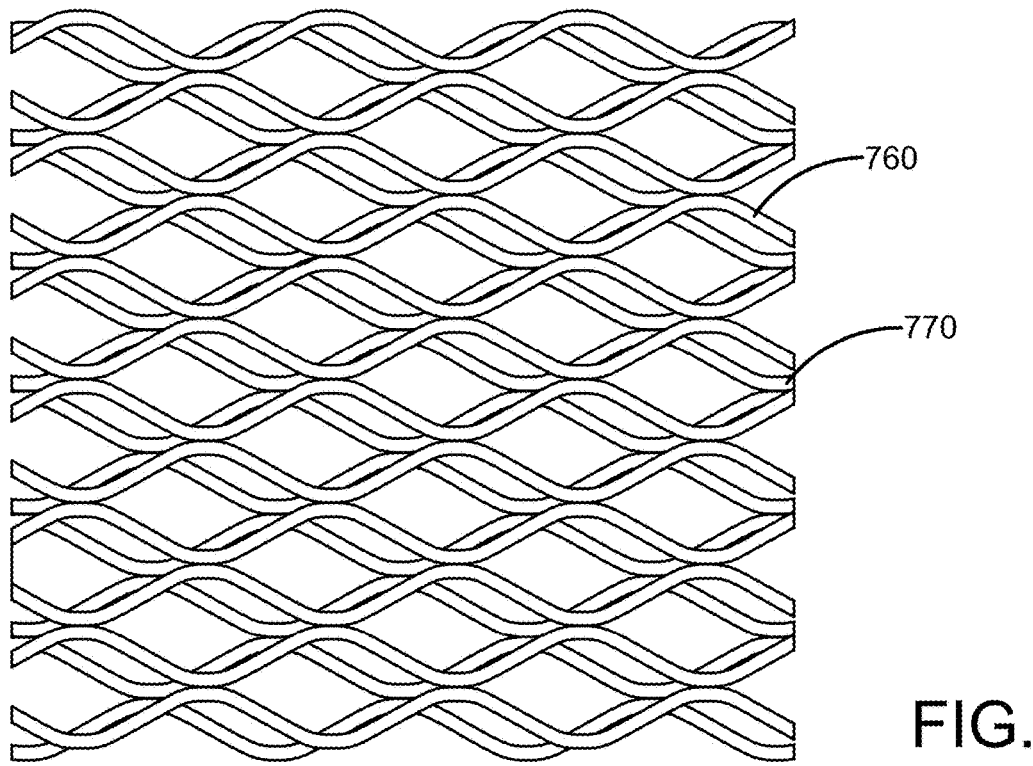

An alternate embodiment 700 of the three dimensional structure is shown in FIGS. 9-10, and comprises a first woven layer 760 of fabric, and a second woven layer 770 of fabric. The first and second layers are joined together by a plurality of cross members 780. The first and second layers 760,770 have an open cell construction.

Figure 11:
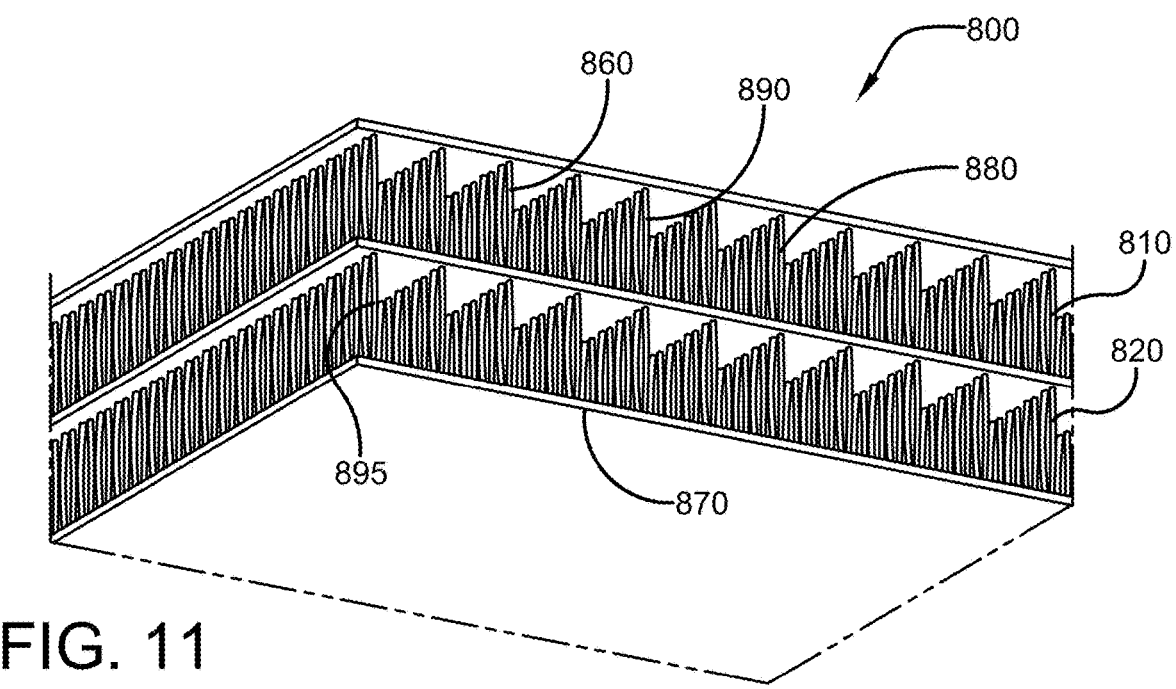

An alternate embodiment 800 of the three dimensional structure is shown in FIG. 11. The seventh embodiment 800 of the three dimensional structure comprises two or more deck layers 810,820. The seventh embodiment 800 has a first woven layer 860 of fabric, a second woven layer 870 of fabric, and a middle woven layer 880. The first and middle layers 860,880 are joined together by a plurality of cross members 890. The second and middle layers 870,880 are also joined together by a plurality of cross members 895. The cross members 890,895 may be angled or curved as shown in FIGS. 4-8.

The radial spokes may each be formed of two layers of three dimensional spacer structures, wherein the structures have different configurations and have cross members aligned in the same or different directions.

Any of the above embodiments may be combined. For example, the cross-members may be curved, angled, orthogonal, or shaped in an "8" in various combinations. The three dimensional structure may comprise any combinations of the various cross members as described above in different orientations. Any of the above described embodiments may be filled with a soft material.

Circumferential Connecting Web

The non-pneumatic tire may additionally include one or more circumferential rings forming a circumferential connecting web 600. The circumferential connecting web may be in the form of one or more circumferential rings. In opposite to the radial connecting webs, the circumferential rings should have a big resistance to the vertical or radial deformation and a lower resistance to the lateral deformation. Their stiffness will depend on their shape.

The circumferential connecting web 600 is designed to be stiff in the radial direction. The circumferential connecting web is preferably reinforced with a three dimensional spacer structure. Thus, if the circumferential connecting web 600 is reinforced with a three dimensional spacer structure as shown in FIGS. 3-11, the cross members of the three dimensional spacer structure 380,480,580,780,890 are aligned with the radial direction of the tire.

If the material selected is a thermoplastic elastomer, then it is preferred to have the following properties. The tensile (Young's) modulus of the disk material is preferably in the range of 45 MPa to 650 MPa, and more preferably in the range of 85 MPa to 300 MPa, using the ISO 527-1/-2 standard test method. The glass transition temperature is less than −25 degree Celsius, and more preferably less than −35 degree Celsius. The yield strain at break is more than 30%, and more preferably more than 40%. The elongation at break is more than or equal to the yield strain, and more preferably, more than 200%. The heat deflection temperature is more than 40 degree C. under 0.45 MPa, and more preferably more than 50 degree C. under 0.45 MPa. No break result for the Izod and Charpy notched test at 23 degree C. using the ISO 179/ISO180 test method. Two suitable materials for the disk is commercially available by DSM Products and sold under the trade name ARNITEL PL 420H and ARNITEL PL461.

Applicants understand that many other variations are apparent to one of ordinary skill in the art from a reading of the above specification. These variations and other variations are within the spirit and scope of the present invention as defined by the following appended claims.

What is claimed is:

1. A non-pneumatic tire comprising
a ground contacting annular tread portion;

a shear band, wherein the shear band is formed of a first and second inextensible layer, and a low modulus material positioned between the first and second inextensible layer, and a connecting web formed of one or more spokes extending between a hub and the shear band, wherein the one or more spokes are formed from a material reinforced with a three dimensional spacer structure, wherein the three dimensional spacer structure is formed from a first and second layer of material interconnected by a plurality of connecting members, wherein the non-pneumatic tire further includes a circumferentially continuous connecting web, wherein the circumferentially continuous connecting web has a higher stiffness in the radial direction than the stiffness in the axial direction.

2. The non-pneumatic tire of claim 1 wherein the spokes are aligned circumferentially in rows.

3. The non-pneumatic tire of claim 1 wherein the connecting members are aligned with the radial direction of the non-pneumatic tire.

4. The non-pneumatic tire of claim 1 wherein the first and second layer of material is knitted.

5. The non-pneumatic tire of claim 1 wherein the first and second layer of material is woven.

6. The non-pneumatic tire of claim 1 wherein the first and second layer of material is nonwoven.

7. The non-pneumatic tire of claim 1 wherein the connecting members are curved.

8. The non-pneumatic tire of claim 1 wherein the three dimensional spacer structure is formed of an auxetic material.

9. The non-pneumatic tire of claim 1 wherein the connecting members are further divided into a first and second set, wherein the connecting members of the first set are crossed with respect to the connecting members of the second set.

10. The non-pneumatic tire of claim 1 wherein the connecting members are perpendicular to the first and second layer of material.

11. The non-pneumatic tire of claim 1 wherein the connecting members are angled with respect to the first and second layer of material.

12. A non-pneumatic tire comprising
a ground contacting annular tread portion;
a shear band, wherein the shear band is formed of a first and second inextensible layer, and a low modulus material positioned between the first and second inextensible layer, and a connecting web formed of one or more spokes extending between a hub and the shear band, wherein the one or more spokes are formed from a material reinforced with a three dimensional spacer structure, wherein the three dimensional spacer structure is formed from a first and second layer of material interconnected by a plurality of connecting members, wherein the one or more spokes have a higher stiffness in the axial direction than the stiffness in the radial direction.

13. A non-pneumatic tire comprising
a ground contacting annular tread portion;
a shear band, wherein the shear band is formed of a first and second inextensible layer, and a low modulus material positioned between the first and second inextensible layer, and a connecting web formed of one or more spokes extending between a hub and the shear band, wherein the one or more spokes are formed from a material reinforced with a three dimensional spacer structure, wherein the three dimensional spacer structure is formed from a first and second layer of material interconnected by a plurality of connecting members, wherein the connecting members are aligned with the axial direction of the non-pneumatic tire.

14. A non-pneumatic tire comprising
a ground contacting annular tread portion;
a shear band, wherein the shear band is formed of a first and second inextensible layer, and a low modulus material positioned between the first and second inextensible layer, and a connecting web formed of one or more spokes extending between a hub and the shear band, wherein the one or more spokes are formed from a material reinforced with a three dimensional spacer structure, wherein the three dimensional spacer structure is formed from a first and second layer of material interconnected by a plurality of connecting members, wherein the connecting members have a defined radial height in the range of 3 to 25 millimeters.

15. A non-pneumatic tire comprising
a ground contacting annular tread portion;
a shear band, wherein the shear band is formed of a first and second inextensible layer, and a low modulus material positioned between the first and second inextensible layer, and a connecting web formed of one or more spokes extending between a hub and the shear band, wherein the one or more spokes are formed from a material reinforced with a three dimensional spacer structure, wherein the three dimensional spacer structure is formed from a first and second layer of material interconnected by a plurality of connecting members, wherein the first and second layer of material has a free area in the range of 5% to 75%.

* * * * *